United States Patent [19]
Schroeder et al.

[11] Patent Number: 5,668,345
[45] Date of Patent: Sep. 16, 1997

[54] AIRBAG INFLATORS EMPLOYING COATED POROUS SUBSTRATES

[75] Inventors: David D. Schroeder, Ogden; Brett Hussey, Bountiful; Walter A. Moore, Ogden, all of Utah

[73] Assignee: Morton International, Inc., Chicago, Ill.

[21] Appl. No.: 545,516

[22] Filed: Oct. 19, 1995

[51] Int. Cl.$^6$ ............................ C06D 5/06; C06B 45/04
[52] U.S. Cl. .................... 102/289; 102/292; 149/17; 280/741
[58] Field of Search ........................ 102/288, 289, 102/292; 149/15, 17; 280/741

[56] References Cited

U.S. PATENT DOCUMENTS

| | | | |
|---|---|---|---|
| 4,464,989 | 8/1984 | Gibson et al. | 102/202 |
| 5,022,991 | 6/1991 | Day et al. | 210/506 |
| 5,351,619 | 10/1994 | Chan et al. | 102/289 |
| 5,411,290 | 5/1995 | Chan et al. | 280/737 |
| 5,429,691 | 7/1995 | Hinshaw et al. | 149/45 |
| 5,439,537 | 8/1995 | Hinshaw et al. | 149/22 |
| 5,505,799 | 4/1996 | Makowiecki | 149/15 |
| 5,518,268 | 5/1996 | Moore et al. | 280/737 |
| 5,518,807 | 5/1996 | Chan et al. | 428/305.5 |
| 5,551,724 | 9/1996 | Armstrong, III et al. | 280/737 |

*Primary Examiner*—Peter A. Nelson
*Attorney, Agent, or Firm*—George W. Rauchfuss, Jr.; Gerald K. White

[57] ABSTRACT

A hybrid inflator has porous substrate coated with a heat-producing, essentially non gas-producing composition for heating pressurized inflation gases in the inflator.

20 Claims, 1 Drawing Sheet

AIRBAG INFLATORS EMPLOYING COATED POROUS SUBSTRATES

FIELD OF THE INVENTION

This invention relates to airbag inflators having an improved form of heat producing compositions and more particularly to stored gas type airbag inflators for inflatable airbag restraint systems of motor vehicles.

BACKGROUND OF THE INVENTION

Automotive supplemental inflatable restraint systems, such as airbag cushion restraint systems, have conventionally employed pyrotechnic inflators, such as inflators containing azide-based gas-generating compositions, to provide inflation gases for inflating the airbag cushion. While pyrotechnic based inflators have provided acceptable airbag inflation, such systems are not without their drawbacks and disadvantages. For example, ignition and burning of the pyrotechnic gas-generating materials produces undesirable hot particulate by-products which can cause damage to the airbag or a vehicle occupant. A considerable amount of effort has gone into producing a pyrotechnic based airbag inflation system in which the inflator traps generated hot particulate material within the inflator body itself so that it cannot escape to damage the airbag. Also, considerable effort has gone into attempts to eliminate the production of such hot particulate materials. Additionally, such pyrotechnic gas-generating compositions pose a problem due to the toxicity of the gas produced.

More recently it has been proposed to replace such pyrotechnic based inflation system with hybrid inflators in which the main proportion of the inflation gases is provided by stored pressurized gas in the inflator. However, such hybrid inflators generally still require the presence of pyrotechnic materials (albeit in a reduced amount) in order to provide ignition and thereby provide supplemental inflation gases and to heat the pressurized stored gas in order to arrange for the release of the stored gas, such as, for example, by providing means or additional pressure to rupture burst disks in the inflator to release the stored pressurized gas.

Even more recently it has been proposed, in co-pending application Ser. No. 08/423,261, filed Apr. 17, 1995, and assigned to the Assignee of this Application, to provide a co-flow hybrid type inflator in which a heat-producing but non gas-producing composition, such as a thermite composition, is ignited by an ignitor material (such as boron potassium nitrate). Stored pressurized gas is caused to flow over and/or through the exothermic thermite reaction product to produce heated pressurized gas sufficient to effectively inflate an inflatable airbag restraint cushion. Such a co-flow hybrid inflator employing a thermite composition is disclosed in FIGS. 6 to 9 and the description at pages 8 to 13 of said co-pending Application.

The aforementioned co-pending Application mentions the use of a thermite composition of aluminum metal fuel and iron oxide oxidizer with the possible addition of supplemental oxidizing agent potassium perchlorate as a burn enhancer. However, it has been discovered that attempts to produce inflators employing such thermite compositions as a non gas-producing heat source for stored pressurized gas in such a co-flow hybrid inflator have not been entirely successful. It has been proposed to form the thermite compositions into extruded pellets, wafers, tablets, grains or the like for use in such co-flow hybrid inflators. However, these extruded forms of the thermite compositions are prone to form dust or powder upon initiation and gas blow-by which prevents complete reaction of the thermite since the thermite dust or powder is carried out of the inflator. Moreover, such extruded forms of thermite compositions can produce undesirable hot particulate matter which can escape from the inflator and be detrimental to the airbag. Another problem encountered with the extruded thermite compositions is the inability to obtain a generally acceptable burn rate. Additionally, such extruded thermite compositions have been found to be very difficult to ignite. Moreover, the temperature needed to ignite the extruded thermite compositions has been undesirably high.

It is therefore desirable to provide an improved form of heat-producing, non gas-producing compositions, particularly thermite compositions, for use in motor vehicle airbag inflators which compositions are more easily ignited and have an increased burn rate. It would also be desirable to provide an improved form of such compositions which enable substantially all the compositions to be ignited and burned within the inflator and to do so without producing substantially any unburned dust or powder or hot particulate matter that can be carried out of the inflator. It is also desirable to provide such improved form of such compositions which are able to ignite at an acceptably low ignition temperature, for example, at a temperature of about 2000° C. or less. It is also desirable to provide an improved form of such compositions of the aforesaid properties and characteristics which compositions still generate heat producing chemical reactions generating little or no gas to augment the performance of stored pressurized gas hybrid inflators and yet still increases the temperature and performance of the stored pressurized gas inflator due to the heat generating characteristics of the improved compositions. It would also be highly desirable if such improved form of such compositions would not produce any significant hot particulate by-product materials. It is also desirable if such improved form of such compositions could be provided with the foregoing characteristics and yet be able to ignite at an acceptably low ignition temperature while still provide inflation performance essentially equivalent to a standard pyrotechnic—stored gas hybrid inflator.

SUMMARY OF THE INVENTION

Airbag inflators with improved forms of heat producing thermite compositions are provided in accordance with this invention by coating metal or ceramic porous substrates with a suitable heat-producing but essentially non gas-producing composition and employing the coated substrate in an airbag inflator for an airbag restraint system of motor vehicles. The metal or ceramic porous substrate is preferably a screen of metal or ceramic material or a porous sintered body of said metal or ceramic material and the heat producing composition is preferably a thermite composition.

The improved forms of heat producing compositions of this invention are produced by forming a slurry of the heat producing composition and forming a coating of the slurry on a porous metal or ceramic substrate. The resulting heat producing composition coated porous substrates may then be employed in airbag inflators, especially co-flow type airbag inflators like that disclosed in the aforementioned Application Ser. No. 08/423,261.

BRIEF DESCRIPTION OF THE DRAWINGS

The invention is illustrated in connection with the following drawings in which.

DETAILED DESCRIPTION OF THE INVENTION

Figure 1:
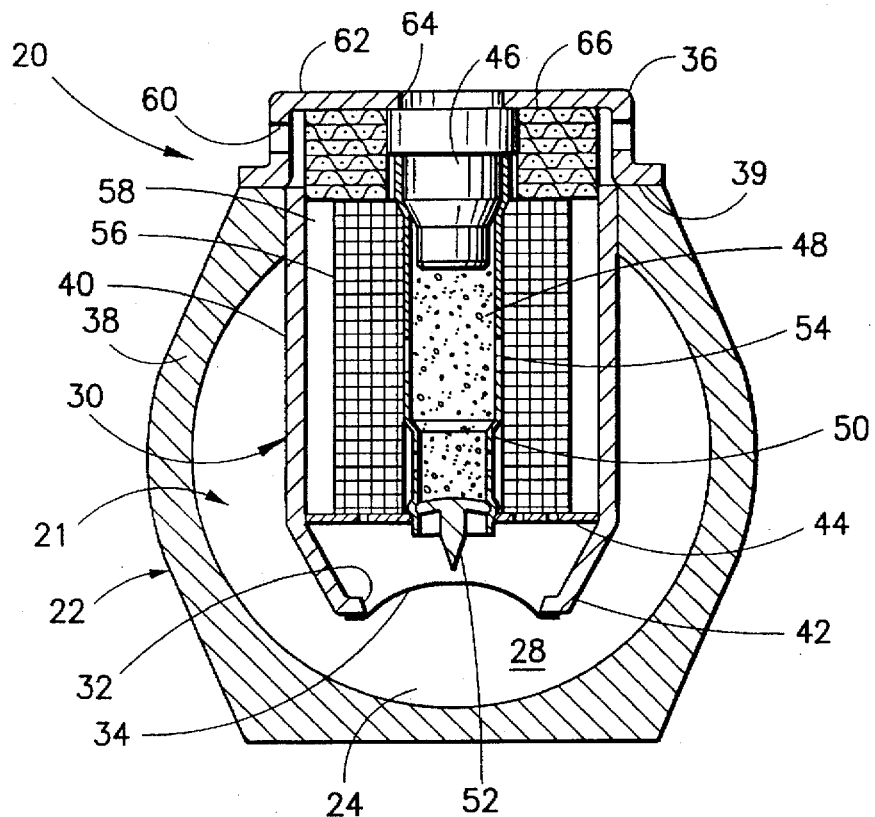
FIG. 1 is an elevational cross-sectional view of a co-flow airbag inflator, prior to deployment, containing a porous substrate coated with a heat producing composition of this invention.

The invention is applicable to any suitable heat-producing but essentially non gas-producing compositions but is especially applicable to thermite type compositions. For purposes of illustrating the invention, reference will be made to suitable thermite type heat producing compositions.

The thermite compositions useful in this invention employ finely divided metal fuels and metal oxide oxidizing agents. The desired exothermic reaction is produced upon ignition of the composition by oxygen breaking away from the metal oxide and reoxidizing with the metal fuel. Any suitable finely divided metal fuel known for use in thermite compositions may be used in this invention. As examples of suitable finely divided metal fuels there may be mentioned, aluminum, titanium, titanium hydride, vanadium, boron and the like, preferably aluminum powder. As examples of suitable metal oxide oxidizers there may be mentioned, ferric oxide ($Fe_2O_3$), titanium oxide (TiO), cupric oxide (CuO), cobaltic oxide ($Co_2O_3$), cobaltous ferrite ($CoFe_2O_4$), manganese dioxide ($MnO_2$) and the like. The finely divided metal fuels and metal oxide oxidizers will generally have a particle size of from about 0.01 to about 300 microns and preferably from about 0.1 to about 100 microns. Most preferably, the particle size of the metal fuel will be about 5 to about 30 microns and the particle size of the metal oxide oxidizer about 0.1 to 3 microns.

The thermite composition can employ a supplemental oxidizing agent which can be any acceptable oxidizing agent but is preferably ammonium perchlorate ($NH_4ClO_4$), potassium perchlorate ($KClO_4$) or potassium chlorate ($KClO_3$) in order to improve the ignitability of the improved thermite compositions.

The thermite composition can also employ a binder suitable to enable the thermite compositions to be consolidated in an acceptable manner on the porous substrate yet producing essentially no unacceptable hot particulate materials upon ignition thereof. As an example of a suitable binder, there may be mentioned hydrated calcium sulfate ($CaSO_4.2H_2O$).

In the improved form of the thermite compositions of this invention the finely divided metal fuel is generally present in an amount from about 20 to about 30% by weight, the metal oxide oxidizer in an amount of from about 40 to about 70% by weight, the binder in an amount of from about 5 to about 25% by weight, preferably about 5 to 10% by weight, and the supplemental oxidizing agent in an amount of from about 2 to about 10% by weight. Generally the binder will be employed at the lowest level at which acceptable consolidation can be achieved in order not to unduly decrease the flame temperature of the igniting composition which would undesirably reduce the ability of the igniting thermite composition to heat the stored pressurized gas in the inflator. In general, therefore, it has been found that a level of binder of about 10% by weight is preferred. Similarly, it is generally desirable to use the least amount of additional or supplemental oxidizing agent necessary to provide for easy ignition of the improved thermite compositions since higher levels can produce safety concerns. For example, the amount of additional oxidizing agent, such as potassium perchlorate, is generally about 2.0% by weight since higher levels of about 5 to 10% by weight can produce compositions that are very sensitive to electrostatic discharge.

As an example of thermite formulations that can be utilized to produce the improved thermite coated substrate products of the invention, there may be mentioned the following representative formulations.

| Component | Formulation Number | |
|---|---|---|
| | 1 | 2 |
| | Component weight % | |
| Aluminum metal powder (5–30 microns) | 27.00 | 26.94 |
| Ferric oxide (0.1–3 microns) | 61.00 | 61.06 |
| Potassium perchlorate | 2.00 | 2.00 |
| Hydrated calcium sulfate | 10.00 | 10.00 |

The porous substrate useful in this invention can be any suitable metal or ceramic porous substrate, preferably in the form of a rigid, porous substrate such as a screen or filter. As examples of suitable porous substrate materials there can be mentioned metal or ceramic substrates of alumina, mellite, zircon, zirconia, spinel, cordierite, lithium aluminosilicates, titania, feldspar, quartz, fused silica, silicon carbide, kaolin clay, aluminum titanate, silicates, aluminates and mixtures thereof. Also porous metal substrates or bodies sintered from powders of aluminum, iron, copper, steel, tin alloys and mixtures thereof provide suitable substrate materials. For purposes of illustrating the invention, reference will be made to the use of a stainless steel screen as the porous substrate. It will be appreciated that the metal substrate may provide the metal fuel, e.g. reticulated aluminum, for the chemical reaction of the thermite composition.

The improved thermite formulation coated substrates of this invention are prepared in the following manner. A thermite formulation, such as described hereinbefore, is slurred by mixing the components of the thermite formulation in a suitable amount of water to form an intimate admixture of the components. The porous substrate is then dipped into or immersed in the slurry to coat the porous substrate and then the coated substrate is withdrawn from the slurry and permitted to dry to drive off the slurry medium leaving a thermite coated porous substrate. The following example is illustrative of such a process.

A 10 mesh, 300 series stainless steel screen was employed as the porous substrate. The screen was cut to a suitable size and wrapped five turns and resistance spot welded to keep in place. The components of thermite Formulation 1 were slurred into water (46% by weight) to form an intimate admixture of the thermite components in the water. The stainless steel screen was then immersed into the thermite slurry to coat the screen with said slurry and then withdrawn from the slurry and the thermite coated screen was placed in a drying oven to drive off the water and form a thermite coated porous substrate. Approximately sixteen grams of thermite composition was coated onto the steel screen substrate.

The thermite coated porous substrates of this invention, such as the substrate formed in the preceding paragraph, can be employed as the heat-producing, non gas-producing material in hybrid inflators, especially of the co-flow type described in the aforementioned co-pending Application Ser. No. 08/423,261. Such thermite coated porous substrates are capable of producing large quantities of intense heat without producing any significant amount of gas or hot particulate material. Moreover, the thermite coated porous substrates will generally ignite at an acceptable low ignition temperature, generally within the range of about 1500° to 2200° C., and generally below about 2000° C.

Figure 2:
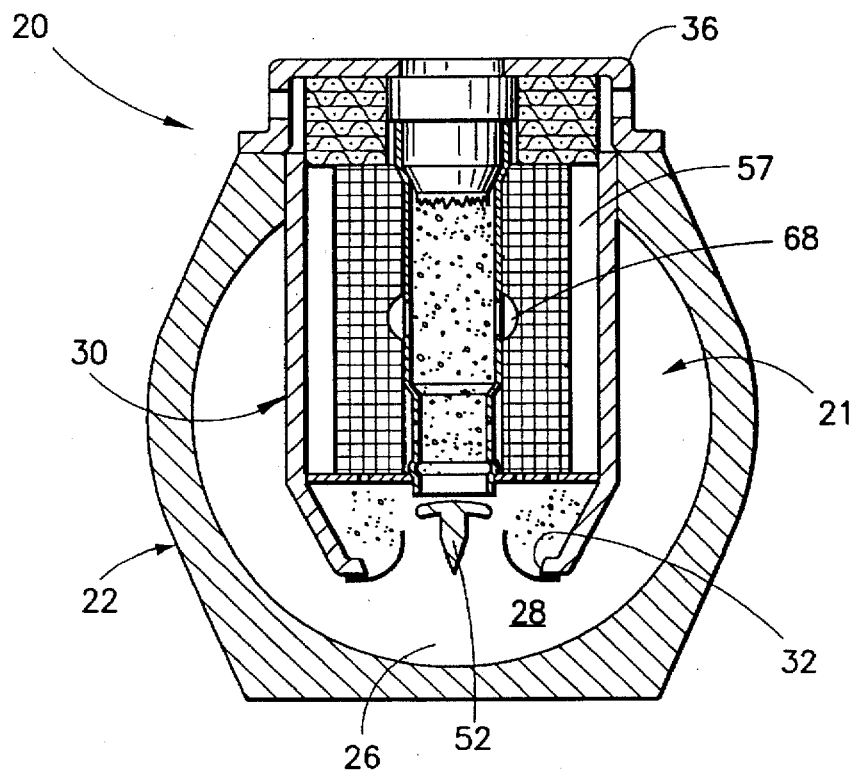
FIG. 2 is an elevational cross-sectional view of the inflator of FIG. 1 following deployment of the inflator.

FIGS. 1 and 2 illustrate an inflator 20 according to the invention herein. The inflator 20 has an elongated housing 21 generally comprised of a center frame 22 fitted with end caps 24 and 26, respectively, shown in the opposite direction views of FIG. 1 and FIG. 2, to form a gas storage chamber 28. A combined ignitor and booster unit 30 is mounted in the center frame 22 and the unit defines an outlet orifice 32 covered by a burst disk 34. The unit 30 also mounts a diffuser 36 for delivering the flow of inflation gasses to an airbag.

The center frame 22 is cut to the desired axial length to accommodate the unit 30. The center frame 22 has a circumferential wall 38 and a flat top surface 39, through which the unit 30 is mounted extending into the gas storage chamber 28.

The ignitor and heating unit 30 includes a tubular sidewall 40 forming a generant cup which tapers inwardly at its lower end 42 to define the outlet orifice 32. The rupturable burst disk 34 deployed across the outlet orifice 32 retains an inert gas such as Argon or Nitrogen within the pressure chamber 28 at a typical pressure of 2,000–4,000 psi.

An annular perforated panel 44 extends across the sidewall 40 at the transition to its lower end 42, and supports an ignition tube 50 centrally within the generant cup 40. The ignition tube 50 is shaped at its upper portion to receive a squib 46, and below the squib 46, the ignition tube contains a pyrotechnic 48, which may be boron potassium nitrate ($BKNO_3$). At the lower end of the ignition tube 50, a projectile 52 is releasably engaged in the ignition tube and aimed toward the burst disk 34. The ignition tube also defines radially disposed openings 54 from the pyrotechnic 48.

The annular space between the generant cup 40 and the ignition tube 50 receives the non gas-producing heating composition which is the coated substrate 56 such as that described hereinbefore. The heating composition coated substrate is provided in a generally tubular configuration surrounding the ignition tube 50, and being porous so that gas may flow from the outlet orifice 32 through perforated annular panel 44 and through the heating composition coated substrate 56 to the diffuser 36. The annular space between the generant cup 40 and the ignition tube 50 need not be completely filled with the coated porous substrate 56 but a portion 58 of this annular space may be left open to provide a passageway for the pressurized gas in chamber 28 to exit from the chamber in addition to passing through the coated porous substrate.

The diffuser 36 is mounted to the center frame 22 above the ignitor and booster unit 30. The diffuser 36 is generally cup-shaped and defines openings 60 in its sidewall for delivering inflation gasses. The top wall 62 of the diffuser defines opening 64 for receiving a plug connector to terminals of the squib 46. Filter screen 66 is contained within the diffuser, to remove debris from the inflation gasses.

The inflator 20 is typically mounted in a reaction can having an airbag mounted thereto, such that inflation gasses from the diffuser are delivered to the interior of the airbag. The inflator 20 operates upon receipt of an electrical impulse from a crash sensor, which fires the squib 46. The squib ignites the pyrotechnic 48 and its rapidly expanding products of combustion drive the projectile 52 downwardly to burst the diaphragm 34 (FIG. 2). The pyrotechnic gas blows through the radial openings 54 in the ignition tube and ignites the heating composition coated on the porous substrate 56, as indicated at 68. Although the pyrotechnic 48 produces some hot gasses, its primary function is to initiate the reaction of the heating composition coated on porous substrate 56.

Upon rupture of the burst disk 34, the pressurized gas in storage chamber 28 flows through the outlet orifice 32 and then through perforated annular panel 44 and through the heating composition coated substrate 56, and exits the inflator through the diffuser openings 60. Because the projectile 52 ruptures the burst disk 34 prior to substantial heat build-up in the unit 30, the early flow of gas is somewhat "soft" and serves to initially deploy the airbag prior to the onset of rapid, heat-boosted inflation. The boosted inflation occurs when the heating composition on the coated substrate is fully ignited, and the gas flowing therethrough is substantially heated and expanded.

The coating of the non gas-producing heat-producing composition onto the porous substrate acts to increase the surface area of the composition which increases burn rate and burn efficiency. Moreover, the coating of the non gas-producing heat-producing composition onto the porous substrate acts to keep the composition within the inflator and thereby permits complete ignition and combustion of the composition in the inflator. Additionally, the coated porous substrate acts to filter particulate matter and prevents its escape into the airbag. Use of such coated porous substrates in co-flow hybrid inflators of the type illustrated in FIGS. 1 and 2 can produce inflation performance essentially equivalent to a standard pyrotechnic—stored gas inflator.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. In a hybrid airbag inflator having a heat-producing, non gas-producing composition present for heating stored pressurized inflation gases in said inflator, the improvement comprising the heat-producing, essentially non gas-producing composition being present in the inflator as a coating on a porous substrate.

2. The hybrid airbag inflator of claim 1 wherein the porous substrate is a metal or ceramic screen or filter.

3. The hybrid airbag inflator of claim 2 wherein the heat-producing, non gas-producing composition coating on the porous substrate is a thermite composition.

4. The hybrid airbag inflator of claim 2 wherein the metal or ceramic substrate is a substrate of a metal or ceramic selected from the group consisting of alumina, mellite, zircon, zirconia, spinel, cordierite, lithium aluminosilicates, titania, feldspar, quartz, fused silica, silicon carbide, kaolin clay, aluminum titanate, silicates, aluminates and mixtures thereof.

5. The hybrid airbag inflator of claim 2 wherein the substrate is a body sintered from a metal powder selected from the group consisting of aluminum, iron, copper, steel, tin alloys and mixtures thereof.

6. The hybrid airbag inflator of claim 3 wherein the metal or ceramic substrate is a substrate of a metal or ceramic selected from the group consisting of alumina, mellite, zircon, zirconia, spinel, cordierite, lithium aluminosilicates, titania, feldspar, quartz, fused silica, silicon carbide, kaolin clay, aluminum titanate, silicates, aluminates and mixtures thereof.

7. The hybrid airbag inflator of claim 3 wherein the substrate is a body sintered from a metal powder selected from the group consisting of aluminum, iron, copper, steel, tin alloys and mixtures thereof.

8. The hybrid airbag inflator of claim 2 wherein the porous substrate is a stainless steel screen.

9. The hybrid airbag inflator of claim 3 wherein the porous substrate is a stainless steel screen.

10. The hybrid airbag inflator of claim 3 wherein said thermite composition comprises:
   a) about 20 to about 30 weight percent of a powdered metal fuel,
   b) about 40 to about 70 weight percent of a powdered metal oxide oxidizer,
   c) about 5 to about 25% weight percent of an essentially non gas-producing, non hot particulate-producing binder, and
   d) about 2 to about 10 weight percent of a supplemental oxidizing agent.

11. The hybrid airbag inflator of claim 10 wherein the powdered metal fuel has a particle size of about 5 to 30 microns and the powdered metal oxide oxidizer has a particle size of about 0.1 to 3 microns.

12. The hybrid airbag inflator of claim 11 wherein the binder is hydrated calcium sulfate and the supplemental oxidizing agent is selected from potassium perchlorate, potassium chlorate and ammonium perchlorate.

13. The hybrid airbag inflator of claim 11 wherein the thermite composition comprises aluminum metal powder and ferric oxide powder.

14. The hybrid airbag inflator of claim 13 wherein the thermite composition also comprises potassium perchlorate and hydrated calcium sulfate.

15. The hybrid airbag inflator of claim 10 wherein:
   a) the powdered metal fuel has a particle size of from about 5 to 30 microns and is selected from the group consisting of aluminum, titanium, titanium hydride, vanadium and boron powder,
   b) the powdered metal oxide oxidizer has a particle size of from about 0.1 to 3 microns and is selected from the group consisting of ferric oxide, titanium oxide, cupric oxide, cobaltic oxide, cobaltous ferrite and manganese oxide,
   c) the binder is anhydrous calcium sulfate in an amount of about 5 to 10% weight percent, and
   d) the supplemental oxidizing agent is selected from potassium perchlorate, potassium chlorate and ammonium perchlorate and is present in an amount of from about 5 to about 10 weight percent.

16. In a hybrid airbag inflator having a heat-producing non gas-generating composition present for heating stored pressurized inflation gases in said inflator, the improvement comprising the heat-producing, essentially non gas-producing composition being present in the inflator as a coating on a porous metal or ceramic substrate and the heat-producing, non gas-producing composition is a thermite composition comprising:
   (a) about 26.94 weight percent aluminum metal powder fuel having a particle size of from about 5 to about 30 microns,
   (b) about 61.06 weight percent ferric oxide oxidizer having a particle size of from about 0.1 to about 3 microns,
   (c) about 10.00 weight percent hydrated calcium sulfate binder, and
   (d) about 2.00 weight percent potassium perchlorate as a supplemental oxidizing agent.

17. In a hybrid airbag inflator having a heat-producing non gas-generating composition present for heating stored pressurized inflation gases in said inflator, the improvement comprising the heat-producing, essentially non gas-producing composition being present in the inflator as a coating on a porous metal or ceramic substrate and the heat-producing, non gas-producing composition is a thermite composition comprising:
   (a) about 27.00 weight percent aluminum metal powder fuel having a particle size of from about 5 to about 30 microns,
   (b) about 61.00 weight percent ferric oxide oxidizer having a particle size of from about 0.1 to about 3 microns,
   (c) about 10.00 weight percent hydrated calcium sulfate binder, and
   (d) about 2.00 weight percent potassium perchlorate as a supplemental oxidizing agent.

18. The hybrid airbag inflator of claim 9 wherein said thermite composition comprises:
   a) about 20 to about 30 weight percent of a powdered metal fuel,
   b) about 40 to about 70 weight percent of a powdered metal oxide oxidizer,
   c) about 5 to about 25% weight percent of an essentially non gas-producing, non hot particulate-producing binder, and
   d) about 2 to about 10 weight percent of a supplemental oxidizing agent.

19. The hybrid airbag inflator of claim 9 wherein:
   a) the powdered metal fuel has a particle size of from about 5 to 30 microns and is selected from the group consisting of aluminum, titanium, titanium hydride, vanadium and boron powder,
   b) the powdered metal oxide oxidizer has a particle size of from about 0.1 to 3 microns and is selected from the group consisting of ferric oxide, titanium oxide, cupric oxide, cobaltic oxide, cobaltous ferrite and manganese oxide,
   c) the binder is anhydrous calcium sulfate in an amount of about 5 to 10% weight percent, and
   d) the supplemental oxidizing agent is selected from potassium perchlorate, potassium chlorate and ammonium perchlorate and is present in an amount of from about 5 to about 10 weight percent.

20. The hybrid inflator of claim 17 wherein the porous substrate is a stainless steel screen.

* * * * *